(12) United States Patent
Yi et al.

(10) Patent No.: US 12,118,960 B2
(45) Date of Patent: Oct. 15, 2024

(54) DISPLAY DEVICE AND CONTROL METHOD THEREFOR

(71) Applicant: SAMSUNG ELECTRONICS CO., LTD., Suwon-si (KR)

(72) Inventors: Sanghun Yi, Suwon-si (KR); Sangwon Kim, Suwon-si (KR); Youngkook Kim, Suwon-si (KR); Jeongryeol Seo, Suwon-si (KR); Sanghoon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/094,125

(22) Filed: Jan. 6, 2023

(65) Prior Publication Data

US 2023/0154439 A1    May 18, 2023

Related U.S. Application Data

(63) Continuation of application No. PCT/KR2021/003162, filed on Mar. 15, 2021.

(30) Foreign Application Priority Data

Jul. 7, 2020   (KR) .................. 10-2020-0083642

(51) Int. Cl.
  *G09G 5/14*      (2006.01)
  *H04B 10/114*    (2013.01)

(52) U.S. Cl.
  CPC ........... *G09G 5/14* (2013.01); *H04B 10/1141* (2013.01); *G09G 2370/06* (2013.01); *G09G 2370/12* (2013.01)

(58) Field of Classification Search
  CPC .... H04W 4/40; H04W 12/12; H04L 12/4641; H04L 12/18; H04L 63/1425;
  (Continued)

(56) References Cited

U.S. PATENT DOCUMENTS 9,736,396 B2    8/2017  Miyamoto
10,917,681 B2   2/2021  Feng et al.
(Continued)

FOREIGN PATENT DOCUMENTS

JP    2009-44558 A    2/2009
JP    2011-166703 A   8/2011
(Continued)

OTHER PUBLICATIONS

International Search Report (PCT/ISA/210) issued Jun. 22, 2021 by the International Searching Authority in International Application No. PCT/KR2021/003162.
(Continued)

*Primary Examiner* — Shaheda A Abdin
(74) *Attorney, Agent, or Firm* — Sughrue Mion, PLLC

(57) ABSTRACT

A display device and a control method therefor are disclosed. The display device includes: a display; a transmitter configured to transmit an infrared (IR) signal; and one or more processors configured to: control the display to display a multi-screen including a plurality of images based on a plurality of image signals received from a plurality of source devices, each of the plurality of source devices using a same IR protocol; perform, based on a user command indicating a first image from among the plurality of images, a process for selectively controlling a first source device, from among the plurality of source devices, which provides the first image; and transmit an IR signal for selectively controlling the first source device through the transmitter.

19 Claims, 13 Drawing Sheets

(58) Field of Classification Search
CPC ... H04L 63/0272; H04L 69/18; H04L 63/029;
H04L 63/145; H04L 69/16; H04L 69/08;
H04L 63/0236; H04L 12/4633; H04L
63/1408
See application file for complete search history.

(56) References Cited

U.S. PATENT DOCUMENTS

| | | | |
|---|---|---|---|
| 2004/0031050 A1* | 2/2004 | Klosterman | H04N 21/4345 725/39 |
| 2006/0107294 A1 | 5/2006 | Rivlin et al. | |
| 2007/0290876 A1* | 12/2007 | Sato | G08C 23/04 340/4.33 |
| 2009/0013366 A1 | 1/2009 | You et al. | |
| 2009/0165059 A1 | 6/2009 | Seki | |
| 2010/0157169 A1 | 1/2010 | Yoshida et al. | |
| 2012/0274547 A1 | 11/2012 | Raeber et al. | |
| 2013/0024709 A1* | 1/2013 | Park | G06F 1/3218 713/323 |
| 2013/0176205 A1 | 7/2013 | Yamashita | |
| 2013/0314396 A1 | 11/2013 | Kang et al. | |
| 2015/0134860 A1 | 5/2015 | Lee et al. | |
| 2015/0301777 A1 | 10/2015 | Jang | |
| 2015/0301783 A1 | 10/2015 | Lee | |
| 2016/0098239 A1* | 4/2016 | Lee | H04N 21/485 348/705 |
| 2016/0133226 A1* | 5/2016 | Park | G06F 3/01 345/1.3 |
| 2017/0288895 A1 | 10/2017 | Marino et al. | |
| 2018/0286346 A1* | 10/2018 | Castano | H04N 21/43635 |
| 2020/0389469 A1* | 12/2020 | Litichever | H04W 4/40 |

FOREIGN PATENT DOCUMENTS

| | | |
|---|---|---|
| JP | 5910660 B2 | 4/2016 |
| JP | 6773289 B2 | 10/2020 |
| KR | 10-2009-0002809 A | 1/2009 |
| KR | 10-1097058 B1 | 12/2011 |
| KR | 10-1241885 B1 | 3/2013 |
| KR | 10-2013-0102322 A | 9/2013 |
| KR | 10-2015-0030696 A | 3/2015 |
| KR | 10-2015-0063747 A | 6/2015 |
| KR | 10-2015-0111098 A | 10/2015 |
| KR | 10-2016-0041243 A | 4/2016 |
| KR | 10-2016-0054249 A | 5/2016 |
| KR | 20170114350 A * | 5/2016 |
| KR | 10-1786319 B1 | 10/2017 |
| KR | 10-2020-0036031 A | 4/2020 |

OTHER PUBLICATIONS

Written Opinion (PCT/ISA/237) issued Jun. 22, 2021 by the International Searching Authority in International Application No. PCT/KR2021/003162.

Extended European Search Report dated Oct. 2, 2023 issued by the European Patent Office in Counterpart European Application No. 21837140.9.

Communication dated May 16, 2024, issued by the Korean Patent Office in Korean Application No. 10-2020-0083642.

* cited by examiner

DISPLAY DEVICE AND CONTROL METHOD THEREFOR

CROSS-REFERENCE TO RELATED APPLICATION(S)

This application is a bypass continuation application of International Application No. PCT/KR2021/003162, filed on Mar. 15, 2021, in the Korean Intellectual Property Receiving Office, which is based on and claims priority to Korean Patent Application No. 10-2020-0083642, filed on Jul. 7, 2020, in the Korean Intellectual Property Office, the disclosures of which are incorporated herein by reference in their entireties.

BACKGROUND

1. Field

The disclosure relates to a display device and a control method therefor. More particularly, the disclosure relates to a display device which displays a multi-screen and a control method therefor.

2. Description of Related Art

With recent developments in multi-tasking technology, display devices capable of displaying various images in one screen are being developed. Display devices as described may divide one screen into a plurality of areas, and provide various information to a user by displaying different images at each of the plurality of areas.

To this end, a display device may be connected with a plurality of source devices that each provide an image. Here, the source device may be various electronic devices such as, for example, a set-top box, a video player, a Blu-ray player, and the like.

When source devices manufactured that use different infrared (IR) protocols are connected to a display device, the source devices may be separately controlled through an integrated remote controller.

However, when source devices that use a common/same IR protocol, such as those manufactured by the same company, are connected to a display device, the source devices cannot be separately controlled through the typical integrated remote controller. In this case, although a user may have operated the integrated remote controller with an intent to control only one source device, another source device that uses the same IR protocol may also be controlled.

SUMMARY

Provided are a display device capable of controlling a plurality of source devices separately even when a plurality of source devices using a same IR protocol is connected and a control method therefor.

Aspects of the disclosure address at least the above-mentioned problems, and provide a display device capable of separately controlling a plurality of source devices that use the same IR protocol, and a control method therefor.

In accordance with an aspect of the disclosure, a display device includes: a display; a transmitter configured to transmit an infrared (IR) signal; and one or more processors configured to: control the display to display a multi-screen including a plurality of images based on a plurality of image signals received from a plurality of source devices, each of the plurality of source devices using a same IR protocol; perform, based on a user command indicating a first image from among the plurality of images, a process for selectively controlling a first source device, from among the plurality of source devices, which provides the first image; and transmit an IR signal for selectively controlling the first source device through the transmitter.

The one or more processors may be further configured to perform, based on the user command, a process for turning-off an IR function of at least one second source device from among the plurality of source devices, the at least one second source device being different than the first source device.

The display device may further include a plurality of interfaces. The plurality of interfaces and the plurality of source devices may be connected through a plurality of high definition multimedia interface (HDMI) cables. The one or more processors may be further configured to transmit a signal through a consumer electronics control (CEC) line of at least one of the plurality of HDMI cables to control the IR function of the at least one second source device to be turned off.

The one or more processors may be further configured to transmit the signal based on a CEC slave address of the at least one second source device.

The display device may further include an interface connected with an Ethernet hub configured to communicate with the plurality of source devices, and the one or more processors may be further configured to transmit a signal to the Ethernet hub to control the IR function of the at least one second source device to be turned off.

The one or more processors may be further configured to transmit the signal based on any one or any combination of a media access control (MAC) address and an internet protocol (IP) address of the at least one second source device.

The transmitter may include a first transmitter connected to a first switch and a second transmitter connected to a second switch, and the one or more processors may be further configured to, based on the user command: turn-on the first switch; turn-off the second switch; and transmit the IR signal for controlling the first source device through the first transmitter.

The first transmitter may be provided adjacent the first source device and the second transmitter may be provided adjacent the at least one second source device.

The one or more processors may be further configured to identify a start bit corresponding to the first source device from among start bits respectively corresponding to the plurality of source devices, and based on the IR signal for controlling the first source device being received, add the start bit corresponding to the first source device and transmit the IR signal with the start bit through the transmitter.

The start bit may be set differently for each of the plurality of source devices.

A common IR protocol may be used by each of the plurality of source devices.

In accordance with an aspect of the disclosure, a control method of a display device, includes: displaying a multi-screen including a plurality of images based on a plurality of image signals received from a plurality of source devices, each of the plurality of source devices using a same IR protocol; performing, based on a user command indicating a first image from among the plurality of images, a process for selectively controlling a first source device, from among the plurality of source devices, which provides the first; and transmitting an infrared (IR) signal for selectively controlling the first source device.

The performing may include performing, based on the user command, a process for turning-off an IR function of at least one second source device from among the plurality of source devices, the at least one second source device being different than the first source device.

The performing may include transmitting a signal through a consumer electronics control (CEC) line of at least one high definition multimedia interface (HDMI) cable connected with the at least one second source device to control the IR function of the at least one second source device to be turned off.

The transmitting may include transmitting the signal based on a CEC slave address of the at least one second source device.

The performing may include transmitting a signal to an Ethernet hub to control the IR function of the at least one second source device to be turned off.

In accordance with an aspect of the disclosure, a non-transitory computer readable recording medium has embodied thereon a program, which when executed by one or more processors of an electronic device, causes the electronic device to execute a method including: displaying a multi-screen including a plurality of images based on a plurality of image signals received from a plurality of source devices; performing, based on a user command indicating a first image from among the plurality of images, a process for selectively controlling a first source device, from among the plurality of source devices, which provides the first; and transmitting an infrared (IR) signal for selectively controlling the first source device.

In accordance with an aspect of the disclosure, a device includes: an output interface; a transmitter configured to transmit an infrared (IR) signal; and one or more processors configured to: control the output interface to output an image signal including a plurality of images based on a plurality of image signals received from a plurality of source devices, each of the plurality of source devices using a same IR protocol; activate an IR function of a first source device from among the plurality of source devices and deactivate the IR function of a second source device from among the plurality of source devices, based on a first user command indicating a first image from among the plurality of images; and transmit a first IR signal for selectively controlling the first source device through the transmitter.

The one or more processors may be further configured to, based on the first user command, activate an IR function of the first source device and deactivate the IR function of a second source device.

The one or more processors may be further configured to, based on a second user command indicating a second image from among the plurality of images: deactivate the IR function of the first source device and activate the IR function of the second source device; and transmit a second IR signal for selectively controlling the second source device through the transmitter.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
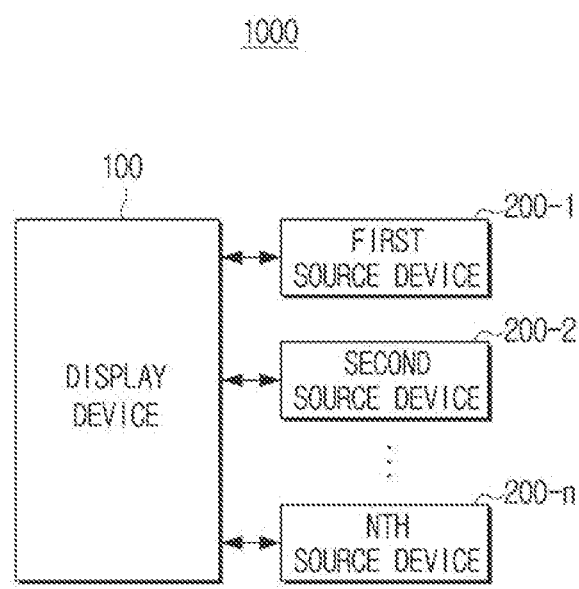
FIG. 1 is a diagram illustrating a display system according to an embodiment.

Hereinafter, embodiments will be described with reference to the accompanying drawings. Like reference numerals refer to like elements and a repeated description related thereto will be omitted. As used herein, the terms "1st" or "first" and "2nd" or "second" may use corresponding components regardless of importance or order and are used to distinguish a component from another component without limiting the components. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Those of ordinary skill in the art will recognize that modification, equivalent, and/or alternative on the various embodiments described herein may be variously made without departing from the scope and spirit of the disclosure.

Terms used herein are general terms selected considering their function herein. However, the terms may change depending on intention, legal or technical interpretation, emergence of new technologies, and the like of those skilled in the art. Further, in certain cases, there may be terms arbitrarily selected. In this case, the meaning of the term may be interpreted as defined in the description, or may be interpreted based on the overall context and the technical common sense according to the art.

In addition, description of known technologies or configurations may be omitted to avoid unnecessarily confusing the disclosure.

Furthermore, although embodiments are described in detail below with reference to the accompanied drawings, the disclosure is not limited by or limited to the specifically described embodiments.

Figure 2:
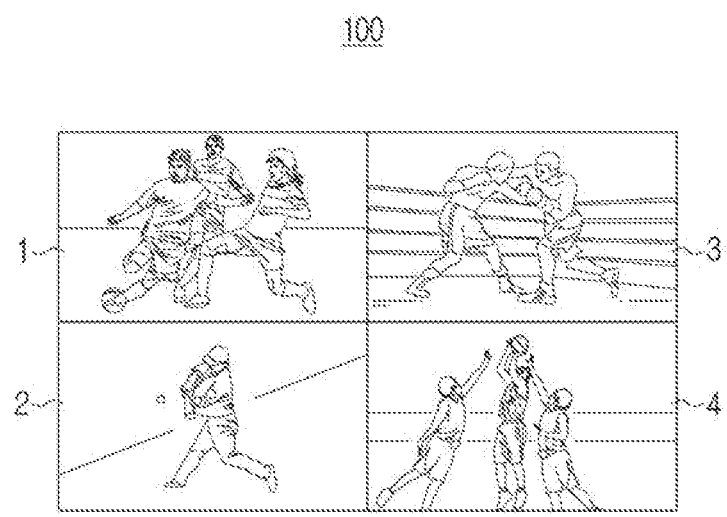
FIG. 2 is a diagram illustrating a multi-screen according to an embodiment.

FIG. 1 is a diagram illustrating a display system according to an embodiment, and FIG. 2 is a diagram illustrating a multi-screen according to an embodiment.

A display system 1000 according to an embodiment may include a display device 100 and a source device 200. Here, the source device 200 may be implemented as a plurality of source devices 200-1, 200-2, . . . , 200-*n* as shown in FIG. 1.

The display device 100 may display various images. Here, an image may be at least one from among a still image or a moving image, and the display device 100 may display various images such as, for example, and without limitation, broadcast content, multi-media content, and the like.

Specifically, the display device 100 may not only display one image, but also display a multi-screen which includes a plurality of images. Here, the multi-screen may include at least two images.

The display device 100 may be connected with the plurality of source devices 200-1, 200-2, . . . , 200-*n*. The display device 100 may receive an image signal from each of the plurality of source devices 200-1, 200-2, . . . , 200-*n*, and display the plurality of images in each different area of a screen based on the received plurality of image signals.

Specifically, the display device 100 may divide, based on a user command for displaying in the multi-screen being received, the screen into a plurality of areas through executing a multi-screen program, and display the plurality of images in each different area of the screen based on the image signal received from the plurality of source devices 200-1, 200-2, . . . , 200-*n*.

In an example, referring to FIG. 2, the display device 100 may divide, based on a user command for displaying four images being received, the screen into a first area, a second area, a third area and a fourth area through executing the multi-screen program. The display device 100 may display a first image 1 at a first area of a display 110 based on a first image signal received from a first source device 200-1, display a second image 2 at a second area of the display 110 based on a second image signal received from a second source device 200-2, display a third image 3 at a third area of the display 110 based on a third image signal received from a third source device 200-3, and display a fourth image 4 at a fourth area of the display 110 based on a fourth image signal received from a fourth source device 200-4.

The display device 100 as described above may be implemented as various display devices which include a display such as, for example, and without limitation, a television (TV), a smart TV, a personal computer (PC), a monitor, a notebook, a large format display (LFD), and the like.

In addition, according to an embodiment, the display device 100 may be implemented as a modular display device. Here, the modular display device may be a device in which a plurality of display devices are coupled, and may be referred to as The Wall, a wall display, and the like. Further, the display device included in the modular display device may be referred to as a sub screen, a cabinet, or the like.

The source device 200 may be any device as long as it is a device which can provide an image to the display device 100. In an example, the source device 200 may be various electronic devices such as, for example, and without limitation, a set top box, a video player, a Blu-ray player, and the like.

At least two from among the plurality of source devices 200-1, 200-2, . . . , 200-*n* described above may be a device manufactured from a same company, and use a same IR protocol.

In an example, in FIG. 2, the first to third images 1, 2, and 3 displayed at the first to third areas may be images of different channels provided by a set top box using the same IR protocol.

In this case, there has been the problem of separately controlling one from among the first to third images 1, 2, and 3 through a typical integrated remote controller. This is because a set top box manufactured from a same company may use the same IR protocol.

In an example, there has been a problem of all of the first to third images 1, 2, and 3 changing channels according to an IR signal transmitted by the integrated remote controller despite a user operating the integrated remote controller to change only the channel of the first image 1.

To solve problems described above, the display device 100 according to embodiments may receive a user command for selecting one from among the plurality of images included in the multi-screen, and perform a process for controlling only the source device providing the selected image according to the user command from among the plurality of source devices 200-1, 200-2, . . . , 200-*n*. The above will be described in detail below with reference to FIG. 3.

Figure 3:
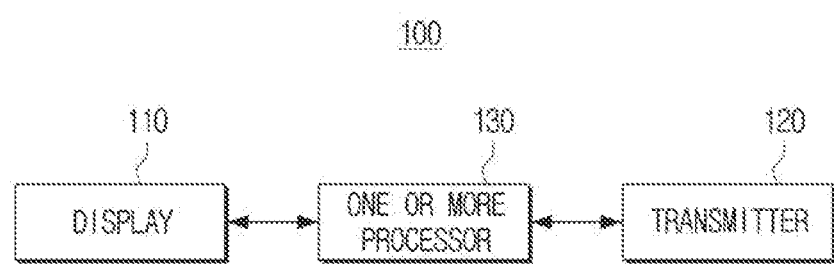
FIG. 3 is a block diagram illustrating a display device according to an embodiment.

FIG. 3 is a block diagram illustrating a display device according to an embodiment.

Referring to FIG. 3, the display device 100 according to an embodiment may include the display 110, a transmitter 120, which may include an IR transmitter, and one or more processors 130.

The display 110 may display various images. Specifically, the display 110 may display one image, and may also display the multi-screen including the plurality of images. Here, the multi-screen may be a screen that includes at least two images, and the plurality of images may be based on a plurality of image signals received from the plurality of source devices 200-1, 200-2, . . . , 200-*n*.

The display 110 may be implemented as a display of various forms such as, for example, and without limitation, a liquid crystal display (LCD) panel, a light emitting diode (LED), an organic light emitting diode (OLED), a liquid crystal on silicon (LCoS), a digital light processing (DLP), and the like. In addition, in the display 110, a driving circuit, which may be implemented in the form of an amorphous silicon (a-Si) thin-film transistor (TFT), a low temperature poly silicon (LTPS) TFT, an organic TFT (OTFT), or the like. The display 110 may include a backlight.

In addition, the display 110 may be implemented as a touch screen coupled with a touch sensing part.

The transmitter 120 may transmit various signals. For example, the transmitter 120 may include an IR transmitter, and the transmitter 120 may transmit the IR signal. Here, the IR signal may not only be a signal for controlling the display device 100, but also a signal for controlling the source device 200 connected to the display device 100.

The transmitter 120 may be implemented in as a single transmitter or as a plurality of transmitters. In an example, the transmitter 120 may be disposed at an upper end center or a lower end center of a front surface of the display device 100. Alternatively, the transmitter 120 may be disposed at each of a lower end left and a lower end right of the front surface of the display device 100.

The one or more processors 130 may control the overall operation of the display device 100. To this end, the one or more processors 130 may include at least one from among a central processing unit (CPU), an application processor (AP), or a communication processor (CP).

The one or more processors 130 may drive an operating system or an application to control hardware or software elements connected to the one or more processors 130, and perform various data processing and calculations. In addition, the one or more processors 130 may load and process instructions or data received from at least one from among other elements in a volatile memory, and store the various data in a non-volatile memory.

The one or more processors 130 may divide, based on a user command for displaying the multi-screen being received, the screen of the display 110 into the plurality of areas through executing the multi-screen program. Here, the user command for displaying the multi-screen may be a user command selecting a screen divide button which is provided in a remote control device such as, for example, and without limitation, a remote controller. In this case, the one or more processors 130 may receive a signal requesting a screen divide from the remote controller through a receiver, and divide the screen of the display into a plurality of areas according to the signal. Of course, the user command for displaying the multi-screen according to an embodiment may be received through a key which is provided in the display device 100.

The one or more processors 130 may control display of the plurality of images at each different area of the screen based on the image signals received from the plurality of source devices 200-1, 200-2, . . . , 200-n.

To this end, the one or more processors 130 may be electrically connected with the plurality of source devices 200-1, 200-2, . . . , 200-n through a plurality of interfaces.

Figure 4:
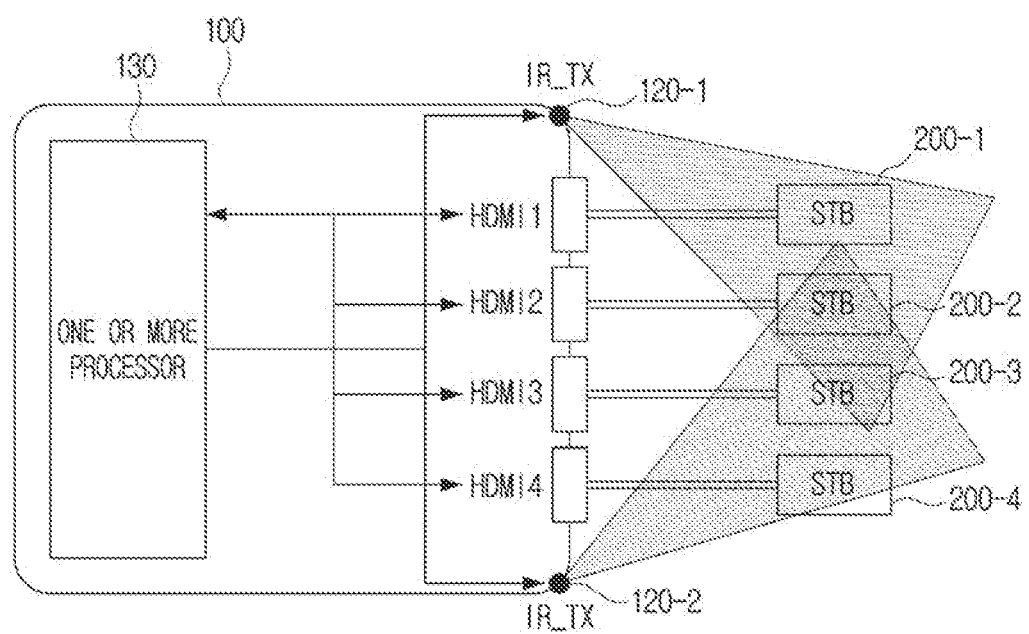
FIG. 4 is a diagram illustrating a configuration of a display device according to an embodiment.

In an example, referring to FIG. 4, the one or more processors 130 may be electrically connected with the plurality of source devices 200-1, 200-2, 200-3, and 200-4 through a high definition multimedia interface (HDMI). In this case, the one or more processors 130 may receive a plurality of image signals from the plurality of source devices 200-1, 200-2, 200-3, and 200-4 through a plurality of HDMI cables connected to the display device 100 through a plurality of HDMI interfaces, and display a plurality of images based on the plurality of images signals.

In an example, the one or more processors 130 may control display of a first image at the first area of the display 110 based on the first image signal received from the first source device 200-1, display a second image at the second area of the display 110 based on the second image signal received from the second source device 200-2, display a third image at the third area of the display 110 based on the third image signal received from the third source device 200-3, and display a fourth image at the fourth area of the display 110 based on the fourth image signal received from the fourth source device 200-4.

The one or more processors 130 may receive a user command for selecting one from among the plurality of images included in the multi-screen.

Here, the user command may be received from the remote controller based on a direction key provided in the remote controller and a user input selecting a select button.

Figure 5:
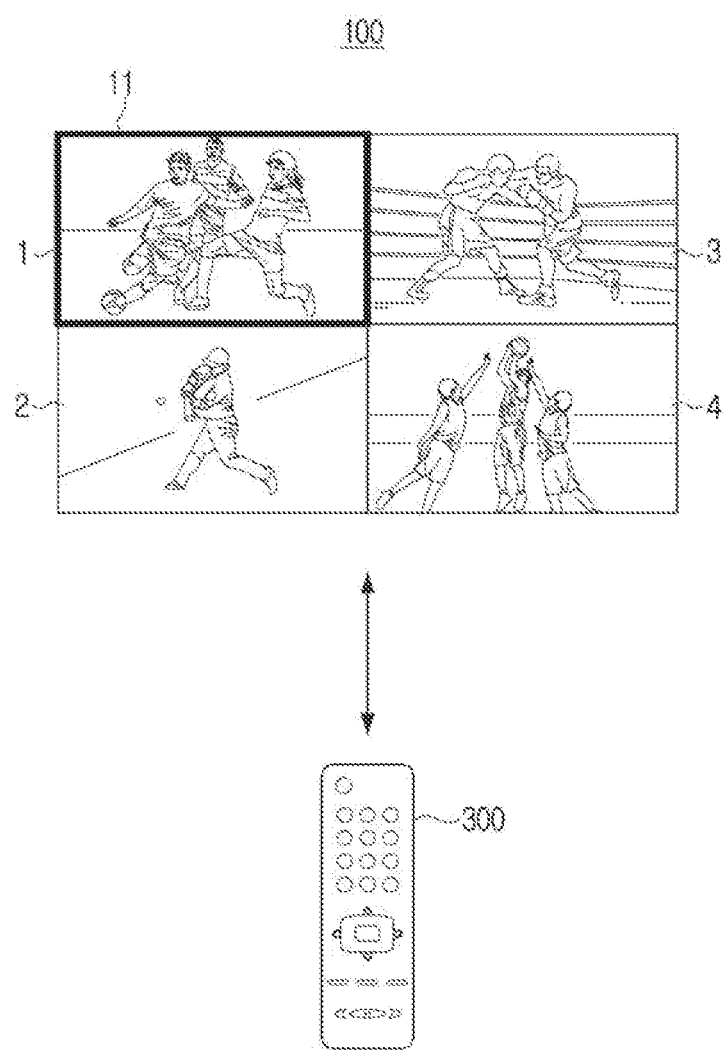
FIG. 5 is a diagram illustrating selection of one from among a plurality of images according to an embodiment.

In an example, referring to FIG. 5, the one or more processors 130 may control display of, based on a first user command which is based on selecting the direction key provided in a remote controller 300 being received from the remote controller 300, an indicator 11 at one image from among the plurality of images 1, 2, 3, and 4 based on the first user command. The one or more processors 130 may select, based on a second user command which is based on selecting the select button provided in the remote controller 300 being received from the remote controller 300, the image 1 on which the indicator 11 is displayed based on the second user command, and identify the first source device 200-1 providing the corresponding image 1.

The user command according to an embodiment may also be received from an input interface based on a user input through the input interface (e.g., a jog switch, etc.) of the display device 100.

The one or more processors 130 may perform a process for controlling the first source device 200-1 which provides the image selected according to the user command from among the plurality of source devices 200-1, 200-2, 200-3, and 200-4.

In an example, the one or more processors 130 may perform a process of turning-off an IR function of the second to fourth source devices 200-2, 200-3, and 200-4, excluding the first source device 200-1 which provides the image selected according to the user command, from among the plurality of source devices 200-1, 200-2, 200-3, and 200-4.

To this end, the one or more processors 130 may determine consumer electronics control (CEC) slave addresses of the second to fourth source devices 200-2, 200-3, and 200-4. Here, the CEC slave address is a unique address of each of the source devices 200-1, 200-2, 200-3, and 200-4, and different CEC slave addresses may be allocated to each of the source devices 200-1, 200-2, 200-3, and 200-4 by the display device 100, which is a CEC master device, and information about the CEC slave addresses of the plurality of source devices 200-1, 200-2, 200-3, and 200-4 may be stored in a memory of the display device 100. Further, the one or more processors 130 may determine the CEC slave addresses of the second to fourth source devices 200-2, 200-3, and 200-4 based on the stored information about the CEC slave addresses.

Specifically, the one or more processors 130 may transmit, based on identifying that the first source device 200-1 was selected according to the user command, a signal requesting the turning-off of the IR function to the second to fourth source devices 200-2, 200-3, and 200-4 based on the CEC slave addresses of the second to fourth source devices 200-2, 200-3, and 200-4. That is, the one or more processors 130 may transmit the signal requesting the turning-off of the IR function to the second to fourth source devices 200-2, 200-3, and 200-4.

Here, the signal requesting the turning-off of the IR function may be transmitted to the second to fourth source devices 200-2, 200-3, and 200-4 through a CEC line (or, CEC link, CEC protocol) of the HDMI cable which is connected to each of the second to fourth source devices 200-2, 200-3, and 200-4.

Specifically, an HDMI interface, which connects to the HDMI cable, may include a plurality of pins, and the one or more processors 130 may transmit the signal requesting the turning-off of the IR function to the second to fourth source devices 200-2, 200-3, and 200-4 through a pin (e.g., HDMI bus pin #13) which corresponds to the CEC function from among the plurality of pins.

In this case, the second to fourth source devices 200-2, 200-3, and 200-4 may turn-off the IR function based on the signal received from the display device 100, and maintain an off state of the IR function. Here, the off state of the IR function may not only be a state in which an IR receiver of the source device 200 has been inactivated, but also a state in which the source device 200 does not process the IR signal even if the IR signal is received through the IR receiver of the source device 200.

The one or more processors 130 may then transmit the IR signal for controlling the first source device 200-1 which provides the image selected according to the user command through the transmitter 120. Here, the transmitter 120 may, as shown in FIG. 4, include a plurality of infrared transmitters 120-1 and 120-2, which may be disposed at different areas of the display device 100.

In an example, the one or more processors 130 may transmit the IR signal for controlling the first source device 200-1 which is received from the remote controller through the transmitter 120. Here, the IR signal for controlling the first source device 200-1 may be a signal for controlling (e.g., changing channels, adjusting a volume, etc.) an image provided by the first source device 200-1, a signal for turning-on or turning-off a power source of the first source device 200-1, or the like.

In this case, because the second to fourth source devices 200-2, 200-3, and 200-4, but not the first source device 200-1, are in a state in which the IR function is turned-off, the second to fourth source devices 200-2, 200-3, and 200-4 may not receive the IR signal transmitted through the transmitter 120 of the display device 100, and may not perform the processing of the IR signal even if the IR signal is received. Because the first source device 200-1 is in a state in which the IR function is turned-on, the IR signal transmitted through the transmitter 120 of the display device 100 may be received by the first source device 200-1, and an operation corresponding to the IR signal may be performed.

Accordingly, the user may selectively control the source device 200-1 intended to be controlled through the IR signal even when the plurality of source devices 200-1, 200-2, and 200-3 using the same IR protocol is connected to the display device 100.

Figure 6:
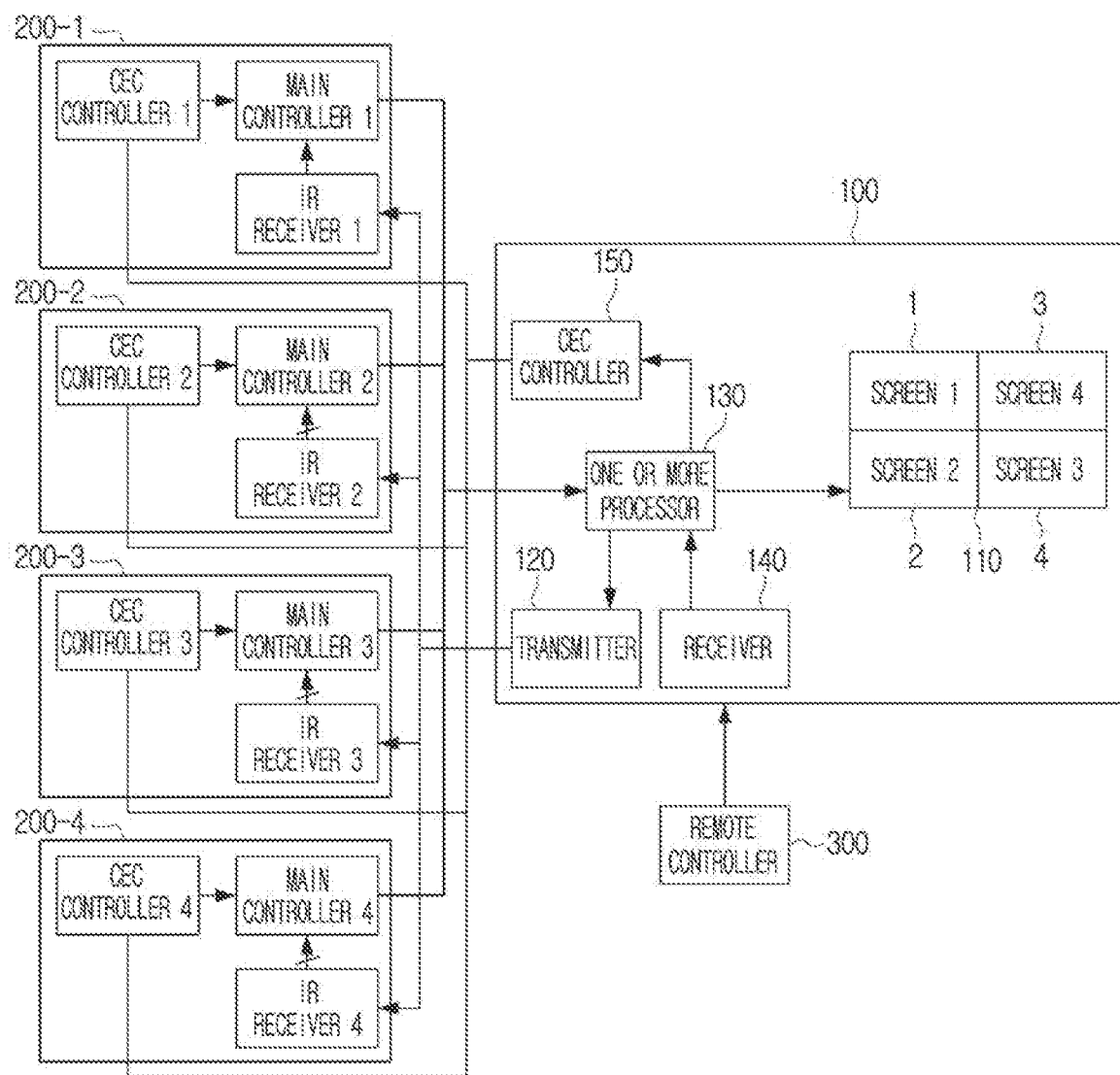
FIG. 6 is a detailed diagram illustrating turning-off an IR function of a source device through a CEC line according to an embodiment.

FIG. 6 is a detailed diagram illustrating turning-off an IR function of a source device through a CEC line according to an embodiment.

As described above, the one or more processors 130 may control display of the multi-screen which includes the plurality of images in the display 110. In an example, referring to FIG. 6, the one or more processors 130 may control display of the first image 1 at the first area of the display 110 based on the first image signal received from the first source device 200-1, display of the second image 2 at the second area of the display 110 based on the second image signal received from the second source device 200-2, display of the third image 3 at the third area of the display 110 based on the third image signal received from the third source device 200-3, and display of the fourth image 4 at the fourth area of the display 110 based on the fourth image signal received from the fourth source device 200-4.

The one or more processors 130 may receive the user command for selecting one from among the plurality of images included in the multi-screen from the remote controller 300 through receiver 140, which may include an IR receiver.

The one or more processors 130 may determine, based on the first source device 200-1 being identified according to the user command, the CEC slave addresses of the second to fourth source devices 200-2, 200-3, and 200-4, and control a CEC controller 150 to transmit the signal requesting the turning-off of the IR function to the second to fourth source devices 200-2, 200-3, and 200-4.

Here, the signal requesting the turning-off of the IR function may be transmitted to the CEC controllers of each of the second to fourth source devices 200-2, 200-3, and 200-4 through the CEC line (or, CEC link, CEC protocol) of the HDMI cable which is connected to each of the second to fourth source devices 200-2, 200-3, and 200-4.

In an example, referring to FIG. 6, the CEC controller 150 may transmit the signal requesting the turning-off of the IR function of the second source device 200-2 to the CEC controller of the second source device 200-2 through the HDMI cable which is connected with the second source device 200-2, transmit the signal requesting the turning-off of the IR function of the third source device 200-3 to the CEC controller of the third source device 200-3 through the HDMI cable which is connected with the third source device 200-3, and transmit the signal requesting the turning-off of the IR function of the fourth source device 200-4 to the CEC controller of the fourth source device 200-4 through the HDMI cable which is connected with the fourth source device 200-4.

In this case, the CEC controller of the second to fourth source devices 200-2, 200-3, and 200-4 may transmit the signal received from the CEC controller 150 of the display device 100 to a main controller as shown in FIG. 6, and the main controller of the second to fourth source devices 200-2, 200-3, and 200-4 may turn-off the IR function based on the signal received from the CEC controller.

In addition, the second to fourth source devices 200-2, 200-3, and 200-4 may transmit, when the signal requesting the turning-off of the IR function is received from the display device 100, an acknowledgment (ack) signal (or, response signal) as a response thereto to the display device 100.

The one or more processors 130 may then transmit, based on the ack signal being received from the second to fourth source devices 200-2, 200-3, and 200-4, the IR signal for controlling the first source device 200-1 which provides the image selected according to the user command through the transmitter 120 (e.g., IR transmitter).

In this case, because the second to fourth source devices 200-2, 200-3, and 200-4, but not the first source device 200-1, are in the state in which the IR function is turned-off, the second to fourth source devices 200-2, 200-3, and 200-4 may not receive the IR signal transmitted through the transmitter 120 of the display device 100, and may not perform the processing of the IR signal even if the IR signal is received. Because the first source device 200-1 is in the state in which the IR function is turned-on, an operation corresponding to the IR signal transmitted through the transmitter 120 of the display device 100 may be performed.

Accordingly, the user may selectively control the source device 200-1 intended to be controlled through the IR signal even when the plurality of source devices 200-1, 200-2, and 200-3 using the same IR protocol is connected to the display device 100.

In FIG. 6, although the CEC controller 150 has been shown as a separate configuration from the one or more processors 130, the function of the CEC controller 150 may be performed by the one or more processors 130 according to an embodiment.

Figure 7:
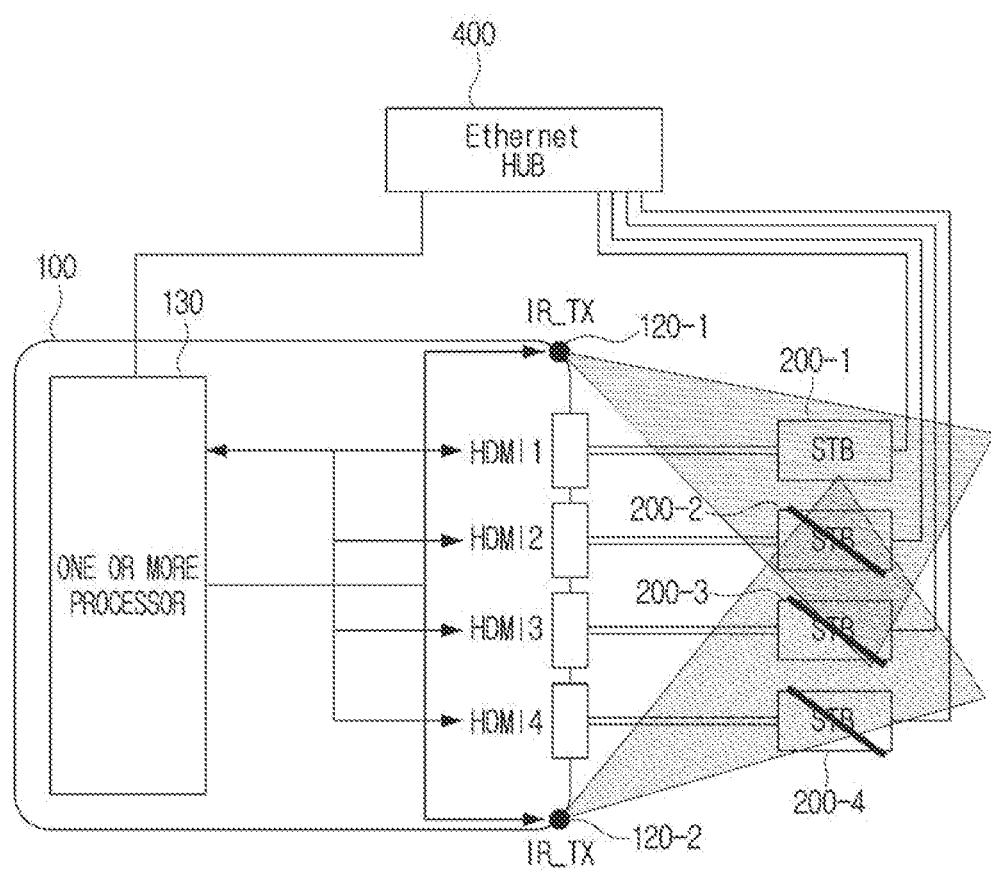
FIG. 7 is a diagram illustrating turning-off an IR function of a source device through an Ethernet hub according to an embodiment.

FIG. 7 is a diagram illustrating turning-off an IR function of a source device through an Ethernet hub according to an embodiment.

Referring to FIG. 7, the one or more processors 130 may be electrically connected with the plurality of source devices 200-1, 200-2, 200-3, and 200-4 through the HDMI cable, and may also be electrically connected with the plurality of source devices 200-1, 200-2, 200-3, and 200-4 through an Ethernet hub 400. To this end, the display device 100 may further include an interface for connecting with the Ethernet hub 400.

Here, the Ethernet hub 400 may be a device which communicates with the plurality of source devices 200-1, 200-2, 200-3, and 200-4, and may provide the signal received from the one or more processors 130 to the plurality of source devices 200-1, 200-2, 200-3, and 200-4.

The one or more processors 130 may control display of the plurality of images received from the plurality of source devices 200-1, 200-2, 200-3, and 200-4 through the HDMI cable.

In an example, the one or more processors 130 may control display of the first image at the first area of the display 110 based on the first image signal received from the first source device 200-1, display of the second image at the second area of the display 110 based on the second image signal received from the second source device 200-2, display of the third image at the third area of the display 110 based on the third image signal received from the third source device 200-3, and display of the fourth image at the fourth area of the display 110 based on the fourth image signal received from the fourth source device 200-4.

The one or more processors 130 may receive the user command for selecting one from among the plurality of images included in the multi-screen. Here, the user command may be received from the remote controller based on a user input selecting the direction key or the select button provided in the remote controller.

In an example, when the user command selecting the first image is received from the remote controller, the one or more processors 130 may identify the first source device 200-1 which provides the first image as selected according to the user command.

The one or more processors 130 may determine, based on the first source device 200-1 being identified according to the user command, at least one from among a media access control (MAC) address and an internet protocol (IP) address of each of the second to fourth source devices 200-2, 200-3, and 200-4. Here, the MAC address may be a unique address that is allocated to the source device 200 at a manufacturing stage of the source device 200, and different MAC addresses may be allocated to each of the source devices 200-1, 200-2, 200-3, and 200-4. The Ethernet hub 400 may identify the MAC addresses of the plurality of source devices 200-1, 200-2, 200-3, and 200-4 when the plurality of source devices 200-1, 200-2, 200-3, and 200-4 is connected, and the one or more processors 130 may determine the MAC addresses of the second to fourth source devices 200-2, 200-3, and 200-4 based on information about the MAC addresses of the plurality of source devices 200-1, 200-2, 200-3, and 200-4 received from the Ethernet hub 400.

The IP address may be a unique address which is allocated to the source device 200 by the Ethernet hub 400, and different IP addresses may be allocated to each of the source devices 200-1, 200-2, 200-3, and 200-4. The Ethernet hub 400 may allocate different IP addresses to the plurality of source devices 200-1, 200-2, 200-3, and 200-4 when the plurality of source devices 200-1, 200-2, 200-3, and 200-4 is connected, and the one or more processors 130 may determine the IP addresses of the second to fourth source devices 200-2, 200-3, and 200-4 based on information about the IP addresses of the plurality of source devices 200-1, 200-2, 200-3, and 200-4 received from the Ethernet hub 400.

The one or more processors 130 may transmit, based on at least one from among the MAC address and the IP address of each of the second to fourth source devices 200-2, 200-3, and 200-4, the signal requesting the turning-off of the IR function of the second to fourth source devices 200-2, 200-3, and 200-4 to the plurality of source devices 200-1, 200-2, 200-3, and 200-4 through the Ethernet hub 400.

In this case, the plurality of source devices 200-1, 200-2, 200-3, and 200-4 may selectively perform the turning-off of the IR function based on the MAC address or the IP address included in the signal requesting the turning-off of the IR function. Specifically, the plurality of source devices 200-1, 200-2, 200-3, and 200-4 may perform the turning-off of the IR function if the MAC address or the IP address included in the signal requesting the turning-off of the IR function is a match with the MAC address or the IP address set in the source device, and not perform the turning-off of the IR function if the MAC address or the IP address included in the signal requesting the turning-off of the IR function is not a match with the MAC address or the IP address set in the source device.

As described above, if at least one from among the MAC address and the IP address of each of the second to fourth source devices 200-2, 200-3, and 200-4 is included in the IR signal, the second to fourth source devices 200-2, 200-3, and 200-4 may turn-off the IR function based on the signal received from the display device 100, and the first source device 200-1 may maintain the turned-on state of the IR function.

Here, the turned-off state of the IR function may not only be a state in which the IR receiver is inactivated by the source device 200, but also a state in which the IR signal is not processed by the source device 200 even if the IR signal is received through the IR receiver.

According to an embodiment, the signal requesting the turning-off of the IR function may be transmitted to the second to fourth source devices 200-2, 200-3, and 200-4 through the Ethernet hub 400. To this end, the Ethernet hub 400 may control a switching operation of switches included in the Ethernet hub 400 based on at least one from among the MAC address and the IP address included in the signal requesting the turning-off of the IR function. In an example, the Ethernet hub 400 may turn-off a switch which determines whether to connect with the first source device 200-1 if at least one from among the MAC address and the IP address of the second to fourth source devices 200-2, 200-3, and 200-4 is included in the signal requesting the turning-off of the IR function, and by turning-on the switches which determine whether to connect with the second to fourth source devices 200-2, 200-3, and 200-4, the signal requesting the turning-off of the IR function may be transmitted to the second to fourth source devices 200-2, 200-3, and 200-4.

The one or more processors 130 may transmit, after performing the above-described process, the IR signal for controlling the first source device 200-1 which provides the image selected according to the user command through the transmitter 120.

In this case, because the second to fourth source devices 200-2, 200-3, and 200-4, but not the first source device 200-1, are in the state in which the IR function is turned-off, the second to fourth source devices 200-2, 200-3, and 200-4 may not receive the IR signal transmitted through the transmitter 120 of the display device 100, and may not perform the processing of the IR signal even if the IR signal is received. Because the first source device 200-1 is in the state in which the IR function is turned-on, an operation corresponding to the IR signal transmitted through the transmitter 120 of the display device 100 may be performed.

Accordingly, the user may selectively control the source device 200-1 intended to be controlled through the IR signal even when the plurality of source devices 200-1, 200-2, and 200-3 using the same IR protocol is connected to the display device 100.

Figure 8:
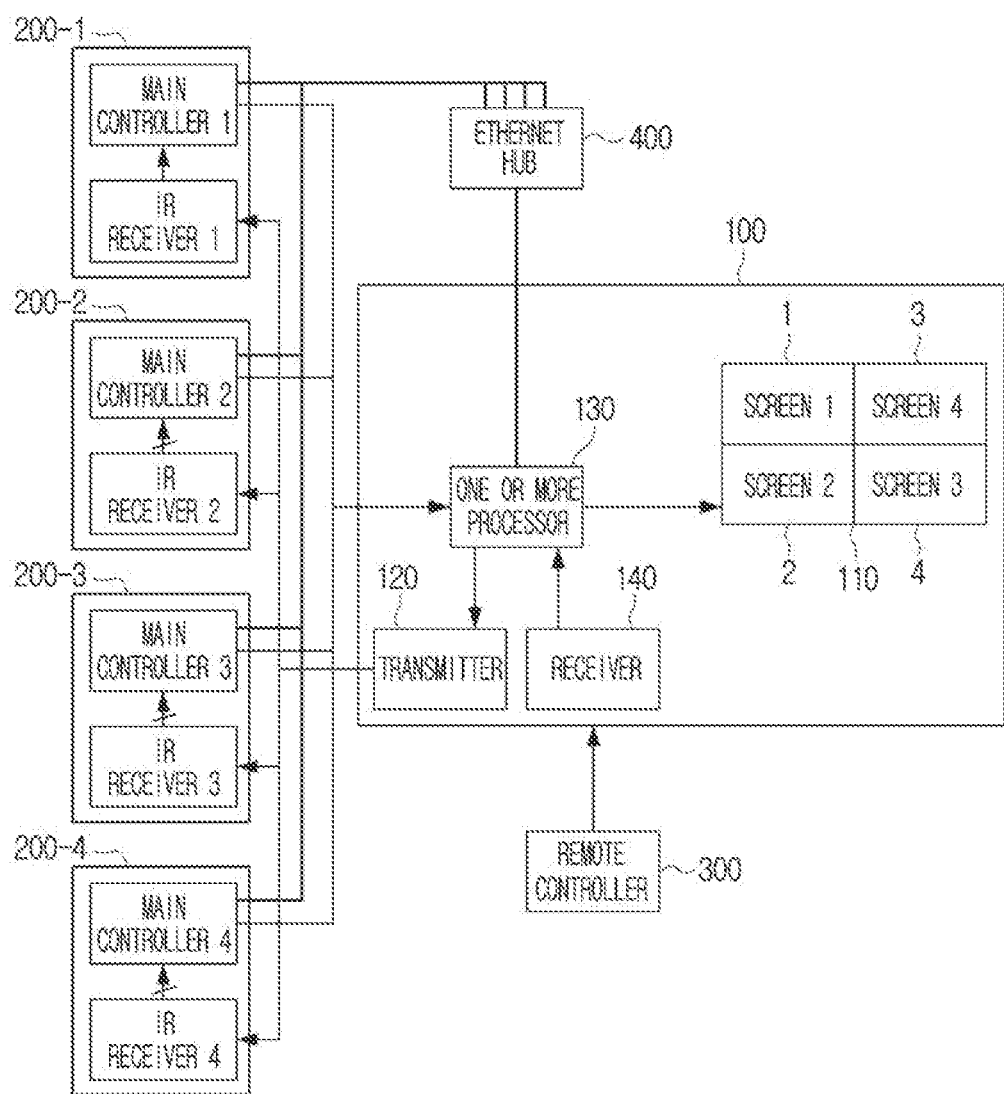
FIG. 8 is a detailed diagram illustrating turning-off an IR function of a source device through an Ethernet hub according to an embodiment.

FIG. 8 is a detailed diagram illustrating an embodiment of turning-off an IR function of a source device through an Ethernet hub according to an embodiment.

As described above, the one or more processors 130 may control display of the multi-screen which includes the plurality of images in the display 110. In an example, referring to FIG. 8, the one or more processors 130 may control display of the first image 1 at the first area of the display 110 based on the first image signal received from the first source device 200-1, display of the second image 2 at the second area of the display 110 based on the second image signal received from the second source device 200-2, display of the third image 3 at the third area of the display 110 based on the third image signal received from the third source device 200-3, and display of the fourth image 4 at the fourth area of the display 110 based on the fourth image signal received from the fourth source device 200-4.

The one or more processors 130 may receive the user command for selecting one from among the plurality of images included in the multi-screen from the remote controller 300 through the receiver 140.

The one or more processors 130 may determine, based on identifying that the first source device 200-1 was selected according to the user command, at least one from among the MAC address and the IP address of the second to fourth source devices 200-2, 200-3, and 200-4, and transmit, based on at least one from among the MAC address and the IP address of the second to fourth source devices 200-2, 200-3, and 200-4, the signal requesting the turning-off of the IR function to the second to fourth source devices 200-2, 200-3, and 200-4 through the Ethernet hub 400.

Here, the signal requesting the turning-off of the IR function may be transmitted to the main controller of each of the plurality of source devices 200-1, 200-2, 200-3, and 200-4 through an Ethernet cable which is connected to each of the second to fourth source devices 200-2, 200-3, and 200-4.

In an example, referring to FIG. 8, the Ethernet hub 400 may transmit the signal requesting the turning-off of the IR function of the first source device 200-1 to the main controller of the first source device 200-1 through the Ethernet cable which is connected with the first source device 200-1, and transmit the signal requesting the turning-off of the IR function of the second source device 200-2 to the main controller of the second source device 200-2 through the Ethernet cable which is connected with the second source device 200-2. The Ethernet hub 400 may transmit the signal requesting the turning-off of the IR function of the third source device 200-3 to the main controller of the third source device 200-3 through the Ethernet cable which is connected with the third source device 200-3, and transmit the signal requesting the turning-off of the IR function of the fourth source device 200-4 to the main controller of the fourth source device 200-4 through the Ethernet cable which is connected with the fourth source device 200-4.

In this case, the main controllers of the second to fourth source devices 200-2, 200-3, and 200-4 may turn-off the IR function based on the signal received from the Ethernet hub 400.

The one or more processors may then transmit the IR signal for controlling the first source device 200-1 which provides the image selected according to the user command through the transmitter 120 (e.g., IR transmitter).

In this case, because the second to fourth source devices 200-2, 200-3, and 200-4, but not the first source device 200-1, are in the state in which the IR function is turned-off, the second to fourth source devices 200-2, 200-3, and 200-4 may not receive the IR signal transmitted through the transmitter 120 of the display device 100, and may not perform the processing of the IR signal even if the IR signal is received. Because the first source device 200-1 is in the state in which the IR function is turned-on, an operation corresponding to the IR signal transmitted through the transmitter 120 of the display device 100 may be performed.

Accordingly, the user may selectively control the source device 200-1 intended to be controlled through the IR signal even when the plurality of source devices 200-1, 200-2, and 200-3 using the same IR protocol is connected to the display device 100.

Figure 9:
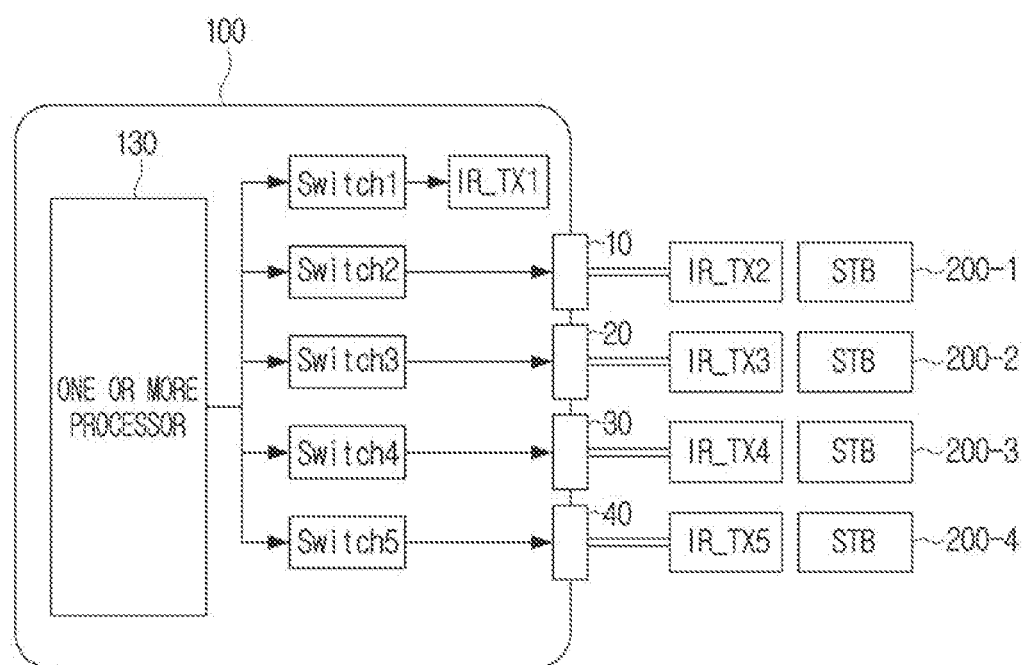
FIG. 9 is a diagram illustrating controlling one source device through a switch according to an embodiment.

FIG. 9 is a diagram illustrating an embodiment of controlling one source device through a switch according to an embodiment.

Referring to FIG. 9, the display device 100 according to an embodiment may include a plurality of switches. Further, the transmitter 120 may include a plurality of transmitters respectively connected to the plurality of switches.

In an example, as shown in FIG. 9, a first switch may be electrically connected with a first transmitter (IR_TX1), a second switch may be electrically connected with a second transmitter (IR_TX2), a third switch may be electrically connected with a third transmitter (IR_TX3), a fourth switch may be electrically connected with a fourth transmitter (IR_TX4), and a fifth switch may be electrically connected with a fifth transmitter (IR_TX5).

Here, the first transmitter (IR_TX1) may be disposed at the front surface of the display device 100. In an example, the first transmitter (IR_TX1) may be disposed at the upper end center or the lower end center of the front surface of the display device 100.

Further, the second transmitter (IR_TX2) may be connected with an interface 10 of the display device 100 through a cable, and disposed adjacently with the first source device 200-1. In addition, the third transmitter (IR_TX3) may be connected with an interface 20 of the display device 100 through a cable, and disposed adjacently with the second source device 200-2, the fourth transmitter (IR_TX4) may be connected with an interface 30 of the display device 100 through a cable, and disposed adjacently with the third source device 200-3, and the fifth transmitter (IR_TX5) may be connected with an interface 40 of the display device 100 through a cable, and disposed adjacently with the fourth source device 200-4.

Accordingly, the IR signal which is transmitted by the first transmitter (IR_TX1) may be received by the plurality of source devices 200-1, 200-2, 200-3, and 200-4. The IR signal which is transmitted by the second transmitter (IR_TX2) may be received by the first source device 200-1, but not the second to fourth source devices 200-2, 200-3, and 200-4. The IR signal which is transmitted by the third transmitter (IR_TX3) may be received by the second source device 200-2, but not the first, third, and fourth source devices 200-1, 200-3, and 200-4. The IR signal which is transmitted by the fourth transmitter (IR_TX4) may be received by the third source device 200-3, but not the first, second, and fourth source devices 200-1, 200-2, and 200-4. The IR signal which is transmitted by the fifth transmitter (IR_TX5) may be received by the fourth source device 200-4, but not the first to third source devices 200-1, 200-2, and 200-3.

The one or more processors 130 may turn-on the first switch when displaying one image through the display 110 (i.e., when operating in a normal-mode), and turn-off the second to fifth switches. The one or more processors 130 may transmit, based on the IR signal for controlling the source device 200 which provides the image being received from the remote controller, the IR signal to the first transmitter (IR_TX1) through the turned-on first switch, and the first transmitter (IR_TX1) may transmit the IR signal to outside. In this case, the source device 200 which received the IR signal may perform an operation based on the IR signal.

The one or more processors 130 may turn-off the first switch when displaying the plurality of images through the display 110 (i.e., when operating in a multi-mode), and turn-on one from among the second to fifth switches.

As described above, the one or more processors 130 may control display of the multi-screen including the plurality of images in the display 110. In an example, the one or more processors 130 may control display of the first image at the first area of the display 110 based on the first image signal received from the first source device 200-1, display of the second image at the second area of the display 110 based on the second image signal received from the second source device 200-2, display of the third image at the third area of the display 110 based on the third image signal received from the third source device 200-3, and display of the fourth image at the fourth area of the display 110 based on the fourth image signal received from the fourth source device 200-4.

The one or more processors 130 may receive the user command for selecting one from among the plurality of images included in the multi-screen from the remote controller through the IR receiver.

The one or more processors 130 may turn-on, based on the first source device 200-1 being identified according to the user command, the second switch connected with the second transmitter (IR_TX2) which is disposed adjacently to the first source device 200-1, and turn-off the remaining switches.

The one or more processors 130 may transmit, based on the IR signal for controlling the first source device 200-1 being received from the remote controller, the IR signal to the second transmitter (IR_TX2) through the turned-on second switch, and the second transmitter (IR_TX2) may transmit the IR signal to the outside.

In this case, because the IR signal transmitted by the second transmitter (IR_TX2) is received by the first source device 200-1 but not the second to fourth source devices 200-2, 200-3, and 200-4, only the first source device 200-1 may perform an operation corresponding to the IR signal.

Accordingly, the user may selectively control the source device 200-1 intended to be controlled through the IR signal even when the plurality of source devices 200-1, 200-2, and 200-3 using the same IR protocol is connected to the display device 100.

Figure 10:
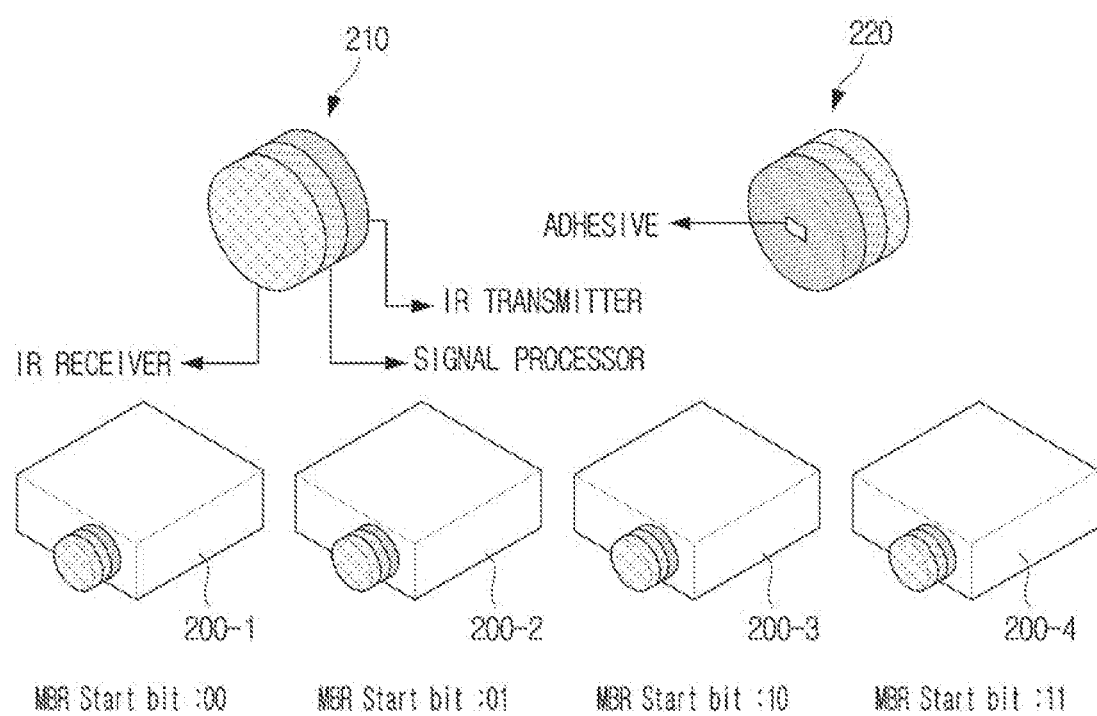
FIG. 10 is a diagram illustrating controlling a source device based on a start bit according to an embodiment.

FIG. 10 is a diagram illustrating an embodiment of controlling a source device based on a start bit according to an embodiment.

Referring to FIG. 10, an IR transceiver 210 according to an embodiment may include an IR receiver, an IR processor, and an IR transmitter. Further, the IR transceiver 210 may be adhered to an IR receiver 220 of the source device 200. To this end, the IR transceiver 210 and the IR receiver 220 may further include a bondable adhesive.

In an example, a first IR transceiver may be adhered to the IR receiver of the first source device 200-1, a second IR transceiver may be adhered to the IR receiver of the second source device 200-2, a third IR transceiver may be adhered to the IR receiver of the third source device 200-3, and a fourth IR transceiver may be adhered to the IR receiver of the fourth source device 200-4.

The IR receiver of the IR transceiver 210 may receive the IR signal transmitted by the transmitter 120 of the display device 100. To this end, the IR receiver may include a component, such as a photodiode, which can receive infrared rays.

The signal processor of the IR transceiver 210 may identify a start bit included in the IR signal received from the display device 100. Here, the start bit may be a bit which notifies a start of data transmission, and different start bits may be set in each IR transceiver attached to the different source devices 200.

In an example, referring to FIG. 10, "00" may be set as the start bit in the first IR transceiver which is attached to the first source device 200-1, "01" may be set as the start bit in the second IR transceiver which is attached to the second source device 200-2, "10" may be set as the start bit in the third IR transceiver which is attached to the third source device 200-3, and "11" may be set as the start bit in the fourth IR transceiver which is attached to the fourth source device 200-4.

The IR transmitter of the IR transceiver 210 may transmit the IR signal received from the display device 100 to the IR receiver 220 of the source device 200. To this end, the IR transmitter may include a component, such as an infrared light-emitting diode, which can transmit infrared rays.

The one or more processors 130 may control display of the multi-screen including the plurality of images in the display 110 as described above.

The one or more processors 130 may receive the user command for selecting one from among the plurality of images included in the multi-screen from the remote controller through the IR receiver.

Further, the one or more processors 130 may determine, based on the first source device 200-1 being identified according to the user command, the start bit set in the first source device 200-1 based on information about the start bit which is set differently for each of the plurality of source devices.

The one or more processors 130 may add, based on the IR signal for controlling the first source device 200-1 being received from the remote controller, the start bit of the first source device 200-1 to the IR signal and transmit the IR signal including the start bit through the transmitter 120.

In an example, the one or more processors 130 may add, based on the IR signal including a custom code and a data code being received from the remote controller, the start bit of the first source device 200-1 to the IR signal, and transmit the IR signal including the start bit, the custom code, and the data code through the transmitter 120.

In this case, the plurality of source devices 200-1, 200-2, 200-3, and 200-4 may receive the IR signal transmitted by the transmitter 120. Specifically, each IR transceiver attached to the plurality of source devices 200-1, 200-2, 200-3, and 200-4 may receive the IR signal transmitted by the transmitter 120.

Each IR transceiver 210 attached to the plurality of source devices 200-1, 200-2, 200-3, and 200-4 may determine the start bit included in the IR signal, and may transmit the IR signal transmitted by the display device 100 to the IR receiver 220 of the source device 200 if the start bit set in the IR transceiver is a match.

In an example, when the start bit of the first source device 200-1 is added to the IR signal as described above, the first IR transceiver attached to the first source device 200-1 may transmit the IR signal to the IR receiver of the first source device 200-1 because the start bit included in the IR signal which is transmitted by the display device 100 and the start bit set in the first IR transceiver are the same, and the first source device 200-1 may perform an operation corresponding to the IR signal received through the IR receiver.

The second IR transceiver attached to the second source device 200-2 may not transmit the IR signal to the IR receiver of the second source device 200-2 because the start bit included in the IR signal which is transmitted by the display device 100 and the start bit of the second IR transceiver attached to the second source device 200-2 are different, and accordingly, the second source device 200-2 may not perform an operation corresponding to the IR signal. Likewise, the third and fourth source devices 200-3 and 200-4 may also not perform operations corresponding to the IR signals because the start bits included in the IR signals and the start bits set in the third and fourth IR transceivers are different.

Accordingly, the user may selectively control the source device 200-1 intended to be controlled through the IR signal even when the plurality of source devices 200-1, 200-2, and 200-3 using the same IR protocol is connected to the display device 100.

Figure 11:
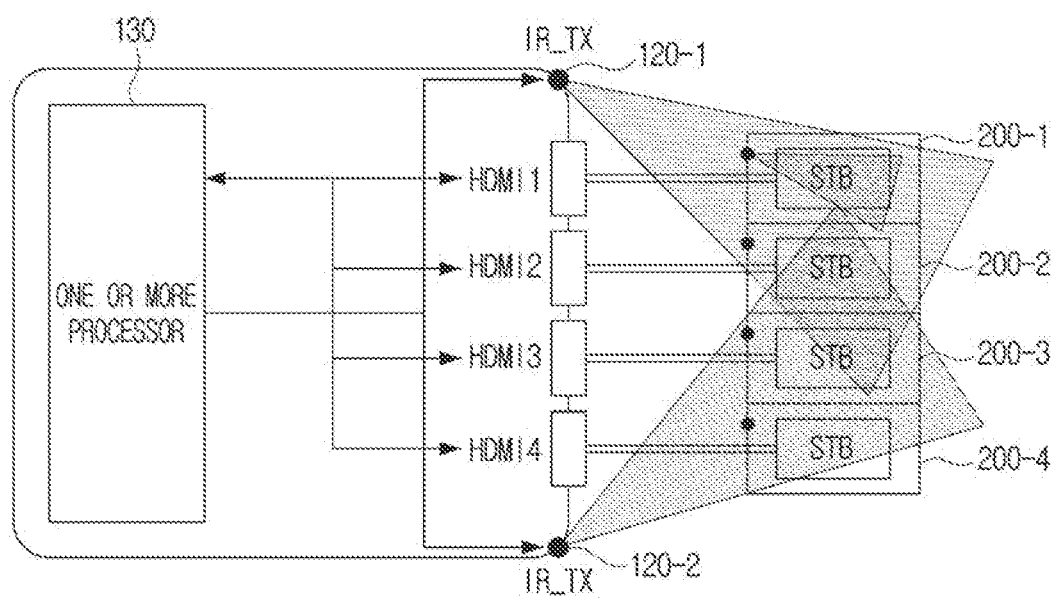
FIG. 11 is a diagram illustrating controlling one source device through a start bit according to an embodiment.

FIG. 11 is a diagram illustrating an embodiment of controlling one source device through a start bit according to an embodiment.

As described above, the one or more processors 130 may control display of the multi-screen including the plurality of images in the display 110. In an example, the one or more processors 130 may control display of the first image at the first area of the display 110 based on the first image signal received from the first source device 200-1, display of the second image at the second area of the display 110 based on the second image signal received from the second source device 200-2, display of the third image at the third area of the display 110 based on the third image signal received from the third source device 200-3, and display of the fourth image at the fourth area of the display 110 based on the fourth image signal received from the fourth source device 200-4.

The one or more processors 130 may receive the user command for selecting one from among the plurality of images included in the multi-screen from the remote controller through the IR receiver.

The one or more processors 130 may determine, based on the first source device 200-1 being identified according to the user command, the start bit set in the first source device 200-1. Specifically, the one or more processors 130 may determine, based on information about start bits which are set differently for each of the plurality of source devices, the start bit of the IR transceiver which is attached to the first source device 200-1.

The one or more processors 130 may add, based on the IR signal for controlling the first source device 200-1 being received from the remote controller, the start bit of the first source device 200-1 to the IR signal and transmit the IR signal with the start bit to the outside.

In this case, each IR transceiver of the plurality of source devices 200-1, 200-2, 200-3, and 200-4 may receive the IR signal.

The first IR transceiver attached to the first source device 200-1 may transmit the IR signal to the receiver of the first source device 200-1 because the start bit set in the first IR transceiver and the start bit included in the IR signal are a match, and accordingly, the first source device 200-1 may perform an operation corresponding to the IR signal.

The second IR transceiver attached to the second source device 200-2 may not transmit the IR signal to the IR receiver of the second source device 200-2 because the start bit included in the IR signal which is transmitted by the display device 100 and the start bit of the second IR transceiver which is attached to the second source device 200-2 are different, and accordingly, the second source device 200-2 may not perform an operation corresponding to the IR signal. Likewise, the third and fourth source devices 200-3 and 200-4 may also not perform operations corresponding to the IR signals because the start bits included in the IR signals and the start bits set in the third and fourth IR transceivers are different.

Accordingly, the user may selectively control the source device 200-1 intended to be controlled through the IR signal even when the plurality of source devices 200-1, 200-2, and 200-3 using the same IR protocol is connected to the display device 100.

Figure 12:
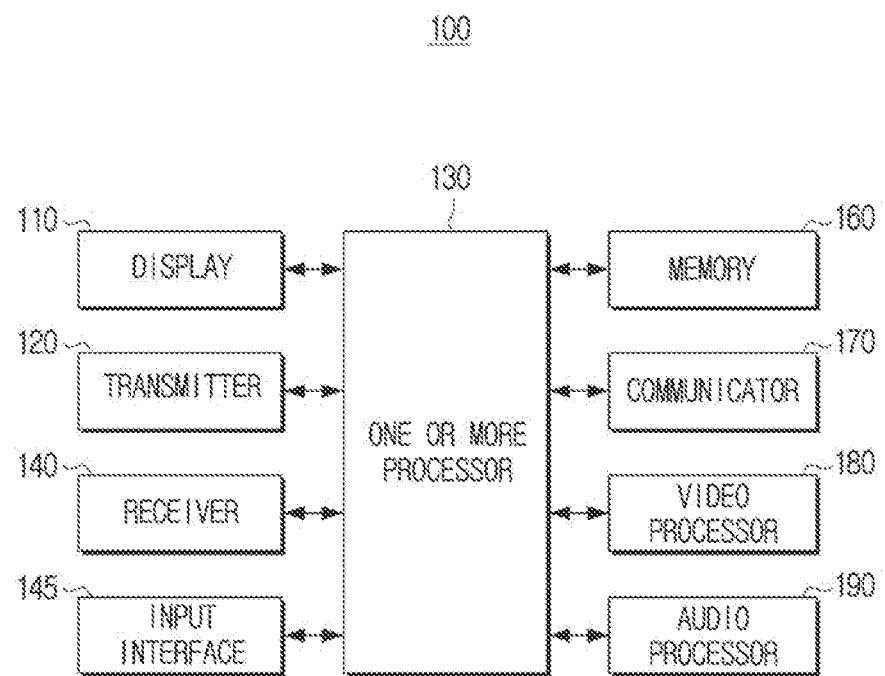
FIG. 12 is a detailed block diagram illustrating a display device according to an embodiment.

FIG. 12 is a detailed block diagram illustrating a display device according to an embodiment. Parts which overlap with the above-described descriptions may be omitted.

Referring to FIG. 12, the display device 100 according to an embodiment may include the display 110, the transmitter 120, the receiver 140, an input interface 145, a memory 160, a communicator 170, a video processor 180, an audio processor 190 and the one or more processors 130.

The receiver 140 may receive various signals. Specifically, the receiver 140 may receive the IR signal from the remote control device such as the remote controller. Here, the IR signal may not only be the signal for controlling the display device 100, but also the signal for controlling the source device 200 which is connected to the display device 100.

To this end, the receiver 140 may include a photodiode for receiving the IR signal.

The input interface 145 may receive input of various user commands for controlling an operation of the display device 100. In an example, the input interface 145 may be implemented as the direction key or the select button, and may receive the user input for selecting one from among the plurality of images included in the multi-screen.

The input interface 145 may be implemented as various input devices which can control the display device 100 such as various interfaces, buttons or touch sensors.

The memory 160 may store commands or data associated with an operating system (OS) and elements of the display device 100 to control the overall operation of the elements of the display device 100.

Accordingly, the one or more processors 130 may control a plurality of hardware or software elements of the display device 100 by using various commands, data, or the like stored in the memory 160, load and process the command or data received from at least one from among the other elements in the volatile memory, and store the various data in the non-volatile memory.

Specifically, the memory 160 may store information about the CEC slave addresses of the plurality of source devices 200-1, 200-2, . . . , 200-$n$. In addition, the memory 160 may store at least one from among the MAC address and the IP address of the plurality of source devices 200-1, 200-2, . . . , 200-$n$. In addition, the memory 160 may store information about the start bit of the plurality of source devices 200-1, 200-2, . . . , 200-$n$.

The communicator 170 may perform communication with various electronic devices according to communication methods of various types.

To this end, the communicator 170 may include at least one communication module from among a short range wireless communication module and a wireless local area network (LAN) communication module. Here, the short range wireless communication module may be a communication module which wirelessly performs data communication with the electronic device positioned at a short distance, and may be, for example, and without limitation, a Bluetooth module, a ZigBee module, a Near Field Communication (NFC) module, and the like. In addition, the wireless LAN communication module may be a module which performs communication by being connected to an external network according to a wireless communication protocol such as, for example, and without limitation, Wi-Fi, IEEE, and the like.

In addition to the above, the communicator 170 may further include a mobile communication module which performs communication by connecting to a mobile communication network according to various mobile communication standards such as, for example, and without limitation, 3rd Generation (3G), 3rd Generation Partnership Project (3GPP), Long Term Evolution (LTE), 5th Generation (5G), and the like. In addition, the communicator 170 may include at least one from among a wired communication interface such as, for example, and without limitation, a Universal Serial Bus (USB), Institute of Electrical and Electronics Engineers (IEEE) 1394, RS-232, and the like, and include a broadcast receiver which receives TV broadcasts.

The display device 100 may receive various broadcast services, internet services, and the like from the electronic device through the communicator 170, communicate with a smartphone, notebook, or the like, and may be connected with a media devices such as a sound bar.

The video processor 180 may process an image signal which includes an image frame that is received through the communicator 170. The video processor 180 may perform decoding, scaling, noise filtering, frame rate conversion, resolution conversion, and the like of the image signal. The image frame processed by the video processor 180 may be displayed in the display 110.

The audio processor 190 may process an audio signal received through the communicator 170. The audio processor 190 may perform decoding, amplifying, noise filtering, and the like of the audio signal. The audio signal processed by the audio processor 190 may output through an audio output interface.

The audio output interface may output various audio signals, various notification sounds, or voice messages which are processed from the audio processor 190.

Figure 13:
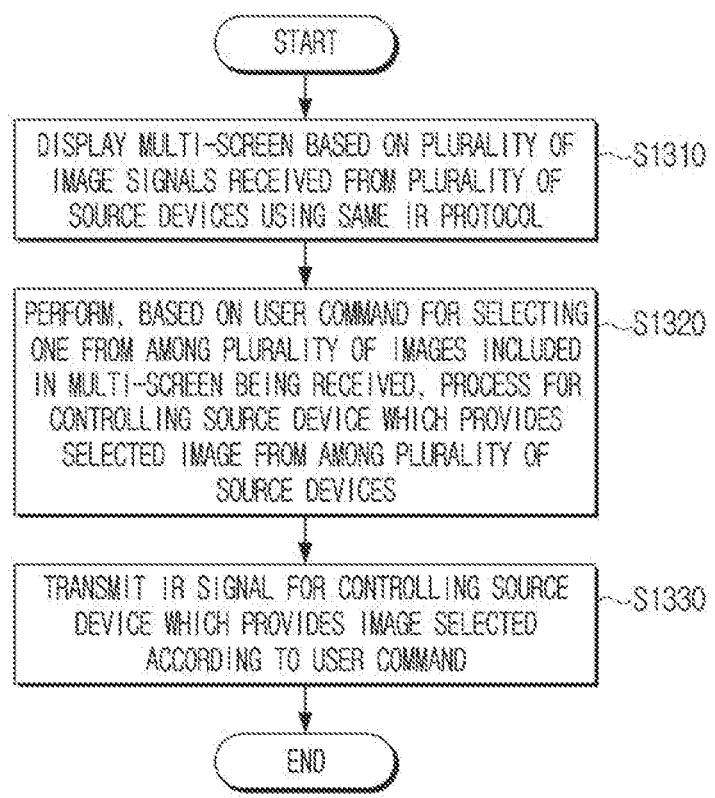
FIG. 13 is a flowchart illustrating an operation of a display device according to an embodiment.

FIG. 13 is a flowchart illustrating an operation of a display device according to an embodiment.

The display device 100 may display the multi-screen based on the plurality of image signals received from the plurality of source devices using the same IR protocol (S1310). Here, the plurality of source devices using the same IR protocol may be source devices of a same type which are manufactured from a same company, and may include, for example, a set top box, and the like.

The display device 100 may perform, based on the user command for selecting one from among the plurality of images included in the multi-screen being received, a process for controlling the source device which provides the selected image from among the plurality of source devices (S1320).

In an example, the display device 100 may perform, based on the user command for selecting one from among the plurality of images included in the multi-screen being received, a process for turning-off the IR function of at least one second source device, while maintaining the IR function on for the first source device, which provides the selected image from among the plurality of source devices.

Specifically, the display device 100 may transmit the signal requesting the turning-off of the IR function to the second source device through the CEC line of the HDMI. To this end, the display device 100 may determine the CEC slave address of the second source device.

Alternatively, the display device 100 may transmit the signal requesting the turning-off of the IR function of the second source device to the Ethernet hub. To this end, the display device 100 may be connected with the Ethernet hub through the Ethernet cable, and the Ethernet hub may be connected with the plurality of source devices through a plurality of Ethernet cables.

Specifically, the display device 100 may transmit, based on at least one from among the MAC address and the IP address of the second source device, the signal requesting the turning-off of the IR function to the Ethernet hub. In this case, the plurality of source devices connected to the Ethernet hub may receive the signal requesting the turning-off of the IR function from the Ethernet hub. The plurality of source devices may selectively perform the turning-off of the IR function based on the MAC address or the IP address included in the signal requesting the turning-off of the IR function. Specifically, the plurality of source devices may perform the turning-off of the IR function if the MAC address or the IP address included in the signal requesting the turning-off of the IR function is a match with the MAC address or the IP address set in the source device, and not perform the turning-off of the IR function if the MAC address or the IP address included in the signal requesting the turning-off of the IR function is not a match with the MAC address or the IP address set in the source device.

Alternatively, the display device 100 may perform controlling of the plurality switches which is connected to each of the plurality of transmitters. Specifically, the display device 100 may turn-on a switch which is connected to a transmitter for transmitting an IR signal to the first source device from among the plurality of switches, and a switch connected to a transmitter for transmitting an IR signal to the second source device may perform the turning-off process.

Alternatively, the display device 100 may determine the start bit set in the first source device from among the start bits set in each of the plurality of devices, and perform the process of adding the determined start bit to the IR signal when the IR signal for controlling the first source device is received The display device 100 may transmit the IR signal for controlling the source device which provides the image selected according to the user command (S1330).

Here, the processing of the IR signal which is transmitted by the display device 100 may be performed by the first source device, and may not be performed in the second source device. This is because, through the various above-described processes, the IR function of the second source device is turned-off, or only the first source device receives the IR signal, or only the first source device processes the IR signal.

Methods according to various embodiments described above may be implemented in the form of a software or application installable in a display device.

In addition, the methods according to the various embodiments described above may be implemented with only a software upgrade or a hardware upgrade of a display device.

In addition, various embodiments described above may be performed through an embedded server provided in the display device, or an external server of the display device.

A non-transitory computer readable medium stored with a program which consecutively performs the control method of the display device according to the disclosure may be provided.

The non-transitory computer readable medium may refer to a medium that stores data semi-permanently rather than storing data for a very short time, such as a register, a cache, a memory, or the like, and is readable by a device. Specifically, the above-described various applications or programs may be stored and provided in the non-transitory computer readable medium such as, for example, and without limitation, a compact disc (CD), a digital versatile disc (DVD), a hard disc, a Blu-ray disc, a USB, a memory card, a ROM, and the like.

While aspects of embodiments have been particularly shown and described, it will be understood that various changes in form and details may be made therein without departing from the spirit and scope of the following claims.

What is claimed is:

1. A display device, comprising:
   a display;
   a transmitter configured to transmit an infrared (IR) signal; and
   one or more processors configured to:
      divide the display into respective areas based on a command to display a multi-screen,
      control the display to display, as the multi-screen, a plurality of images in respective areas of the display, based on a plurality of image signals received from a plurality of source devices, each of the plurality of source devices using a same IR protocol,
      control the display to display an indicator selectively indicating one of the displayed plurality of images according to a first user command, while controlling the display to display the plurality of images in the respective areas of the display,
      receive a second user command indicating selection of a first image from among the displayed plurality of images while controlling the display to display the plurality of images in the respective areas of the display and the indicator selectively indicating the first image, and identify a first source device which provides the first image, from among the plurality of source devices,
      perform a process for selectively controlling the first source device, and turning-off an IR function of at least one second source device from among the plurality of source devices, and
      transmit an IR signal for selectively controlling the first source device through the transmitter while controlling the display to display the plurality of images in the respective areas of the display.

2. The display device of claim 1, further comprising a plurality of interfaces,
   wherein the plurality of interfaces and the plurality of source devices are connected through a plurality of high definition multimedia interface (HDMI) cables, and
   wherein the one or more processors is further configured to transmit a signal through a consumer electronics control (CEC) line of at least one of the plurality of HDMI cables to control the IR function of the at least one second source device to be turned off.

3. The display device of claim 2, wherein the one or more processors is further configured to transmit the signal based on a CEC slave address of the at least one second source device.

4. The display device of claim 1, further comprising an interface connected with an Ethernet hub configured to communicate with the plurality of source devices,
   wherein the one or more processors is further configured to transmit a signal to the Ethernet hub to control the IR function of the at least one second source device to be turned off while continuing to display at least one second image provided by the at least one second source device.

5. The display device of claim 4, wherein the one or more processors is further configured to transmit the signal based on any one or any combination of a media access control (MAC) address and an internet protocol (IP) address of the at least one second source device.

6. The display device of claim 1, wherein the transmitter comprises a first transmitter connected to a first switch and a second transmitter connected to a second switch, and
   wherein the one or more processors is further configured to, based on the second user command:
      turn-on the first switch;
      turn-off the second switch; and
      transmit the IR signal for controlling the first source device through the first transmitter.

7. The display device of claim 6, wherein the first transmitter is provided adjacent the first source device and the second transmitter is provided adjacent at least one second source device from among the plurality of source devices.

8. The display device of claim 1, wherein the one or more processors is further configured to identify a start bit corresponding to the first source device from among start bits respectively corresponding to the plurality of source devices, and based on the IR signal for controlling the first source device being received, add the start bit corresponding to the first source device and transmit the IR signal with the start bit through the transmitter.

9. The display device of claim 8, wherein the start bit is set differently for each of the plurality of source devices.

10. The display device of claim 1, wherein the first user command corresponds to a direction command, and
    wherein the second user command corresponds to a select command.

11. The display device of claim 1, wherein the indicator surrounds the one of the displayed plurality of images.

12. A control method of a display device, the control method comprising:
    dividing a display of the display device into respective areas based on a command to display a multi-screen;
    controlling the display to display, as the multi-screen, a plurality of images in respective areas of the display, based on a plurality of image signals received from a plurality of source devices, each of the plurality of source devices using a same IR protocol;
    controlling the display to display an indicator selectively indicating one of the displayed plurality of images according to a first user command, while controlling the display to display the plurality of images in the respective areas of the display,
    receiving a second user command indicating selection of a first image from among the displayed plurality of images while controlling the display to display the plurality of images in the respective areas of the display and the indicator selectively indicating the first image, and identifying a first source device which provides the first image, from among the plurality of source devices;

performing a process for selectively controlling the first source device and turning-off an IR function of at least one second source device from among the plurality of source devices; and transmitting an infrared (IR) signal for selectively controlling the first source device while controlling the display to display the plurality of images in the respective areas of the display.

13. The control method of claim 12, wherein the performing comprises transmitting a signal through a consumer electronics control (CEC) line of at least one high definition multimedia interface (HDMI) cable connected with the at least one second source device to control the IR function of the at least one second source device to be turned off.

14. The control method of claim 13, wherein the transmitting comprises transmitting the signal based on a CEC slave address of the at least one second source device.

15. The control method of claim 12, wherein the performing comprises transmitting a signal to an Ethernet hub to control the IR function of the at least one second source device to be turned off while continuing to display at least one second image provided by the at least one second source device.

16. A non-transitory computer readable recording medium having embodied thereon a program, which when executed by one or more processors of an electronic device, causes the electronic device to execute a method including:
dividing a display of the electronic device into respective areas based on a command to display a multi-screen;
controlling the display to display, as the multi-screen comprising a plurality of images in respective areas of the display, based on a plurality of image signals received from a plurality of source devices, each of the plurality of source devices using a same IR protocol;
controlling the display to display an indicator selectively indicating one of the displayed plurality of images according to a first user command, while controlling the display to display the plurality of images in the respective areas of the display,
receiving a second user command indicating selection of a first image from among the displayed plurality of images while controlling the display to display the plurality of images in the respective areas of the display and the indicator selectively indicating the first image, and identifying a first source device which provides the first image, from among the plurality of source devices;
performing a process for selectively controlling the first source device and turning-off an IR function of at least one second source device from among the plurality of source devices; and
transmitting an infrared (IR) signal for selectively controlling the first source device while displaying the plurality of images in the respective areas of the display.

17. A device comprising:
an output interface;
a transmitter configured to transmit an infrared (IR) signal; and
one or more processors configured to:

control the output interface to output an image signal concurrently indicating a plurality of images associated with respective areas, based on a plurality of image signals received from a plurality of source devices;
control a display of the device to display an indicator selectively indicating one of the displayed plurality of images according to a first user command, while controlling the display to display the plurality of images in the respective areas of the display,
receive a second user command indicating selection of a first image from among the plurality of images while controlling the output interface to output the image signal concurrently indicating the plurality of image signals and the indicator selectively indicating the first image, and identify a first source device which provides the first image, from among the plurality of source devices,
activate an IR function of the first source device from among the plurality of source devices and deactivate the IR function of a second source device from among the plurality of source devices; and
transmit a first IR signal for selectively controlling the first source device through the transmitter while controlling the output interface to output the image signal concurrently indicating the plurality of image signals.

18. The device of claim 17, wherein the one or more processors is further configured to, based on a third user command indicating a second image from among the plurality of images:
deactivate the IR function of the first source device and activate the IR function of the second source device; and
transmit a second IR signal for selectively controlling the second source device through the transmitter.

19. The device of claim 18, further comprising a first interface corresponding to the first source device and a second interface corresponding to the second source device, wherein the one or more processors is further configured to:
activate the IR function of the first source device by controlling a first activation control signal to be transmitted to the first source device through the first interface;
deactivate the IR function of the first source device by controlling a first deactivation control signal to be transmitted to the first source device through the first interface;
activate the IR function of the second source device by controlling a second activation control signal to be transmitted to the second source device through the second interface; and
deactivate the IR function of the second source device by controlling a second deactivation control signal to be transmitted to the second source device through the second interface.

* * * * *